United States Patent [19]

Schmid et al.

[11] 4,412,767
[45] Nov. 1, 1983

[54] TOOL HOLDER

[75] Inventors: Herbert Schmid, Renningen; Ernst Schmid, Ditzingen, both of Fed. Rep. of Germany

[73] Assignee: Santrade Ltd., Lucerne, Switzerland

[21] Appl. No.: 181,749

[22] Filed: Aug. 27, 1980

[30] Foreign Application Priority Data

Sep. 20, 1979 [DE] Fed. Rep. of Germany ....... 7907796

[51] Int. Cl.³ .......................... B23C 9/00; B23B 31/00
[52] U.S. Cl. ................................. 409/234; 279/1 A; 279/75
[58] Field of Search ............... 409/232, 234; 279/1 A, 279/89, 30, 75, 90, 51, 8; 408/240, 234; 279/2 R, 22, 30

[56] References Cited

U.S. PATENT DOCUMENTS

| 1,548,730 | 8/1925 | Mirfield | 279/2 |
|---|---|---|---|
| 2,250,631 | 7/1941 | Groene et al. | 279/2 |
| 2,583,264 | 1/1952 | Herrmann | 409/232 |
| 2,970,844 | 2/1961 | Better | 279/75 |
| 3,311,023 | 3/1967 | Kaiser | 409/232 |
| 3,596,917 | 8/1971 | Meyer | 279/89 |
| 3,599,996 | 8/1971 | Holt | 279/89 |
| 3,622,169 | 11/1971 | Koch | 279/89 |
| 3,622,170 | 11/1971 | Sedgwick | 279/89 |
| 3,658,351 | 4/1972 | Benjamin | 279/89 |
| 3,658,352 | 4/1972 | Koch | 279/89 |
| 4,077,736 | 3/1978 | Hutchens | 279/1 A |
| 4,202,102 | 5/1980 | Nakanishki | 279/51 |
| 4,350,463 | 9/1982 | Friedline | 408/240 |

FOREIGN PATENT DOCUMENTS

| 1552556 | 2/1971 | Fed. Rep. of Germany . | |
| 2741810 | 3/1979 | Fed. Rep. of Germany . | |
| 1017317 | 5/1950 | France | 279/8 |
| 2437910 | 6/1980 | France | 279/75 |

*Primary Examiner*—William R. Briggs
*Attorney, Agent, or Firm*—Burns, Doane, Swecker & Mathis

[57] ABSTRACT

A tool holder for carrying a cutting tool is attached to a drive spindle. For purposes of making possible a rapid and easy exchange of the tool holder while at the same time there is required a small working space the tool holder is carried by an adapter, which interiorly guides a pin on the tool holder. The tool holder is clamped against the adapter by applying a clamping force on a transversal abutting surface on the tool holder.

2 Claims, 6 Drawing Figures

TOOL HOLDER

This invention relates to a mounting device for securing a tool holder to a drive spindle comprising an adapter which, in use, is attached to the drive spindle and carries the tool holder.

Drive spindles of machine tools are in their outer end usually provided with a conical bore, which is intended to receive a tool holder having a corresponding taper. When a cutting tool has to be exchanged, then as a rule also the tool holder must be exchanged. Due to its taper the tool holder then has to be moved a long axial distance. This is with regard to the weight of the tool holder a heavy operation, which requires a great deal of room.

An object of the present invention is to provide a mounting device in which the replaceable member of the tool holder has a comparatively low weight while at the same time requiring a small axial movement during detachment thereof.

Tool holders having standard cone are usually secured by means of clamping elements, which require drive spindles with a bore passing longitudinally therethrough. Alternatively the tool holder can be fastened with screws to the front end of the drive spindle, which is a stable connection, but, however, also is a time consuming operation.

Another, and the essential, object of the invention is to provide a mounting device which besides that it requires a small working space due to a short axial movement of the tool holder during exchange thereof can be used in connection with drive spindles without any longitudinal central bore.

A further object of the invention is to provide a coupling, which can be connected and disconnected comparatively rapidly.

The above and other objects of the invention have been attained by giving the invention the characterizing features stated in the appending claims.

The invention is described in detail in the following description with reference to the accompanying drawings in which three embodiments are shown by way of example. It is to be understood that these embodiments are only illustrative of the invention and that various modifications thereof may be made within the scope of the claims.

In the drawings, FIG. 1 shows a longitudinal section through a preferred embodiment of a device according to the invention. For purposes of more clearly illustrating the ball locking system included therein the section is taken on the line I—I in FIG. 2.

The expressions "front end" and "forwardly directed" in the description and the claims relate to respectively the end of a member facing the cutting tool and a direction toward the cutting tool.

Figure 1:
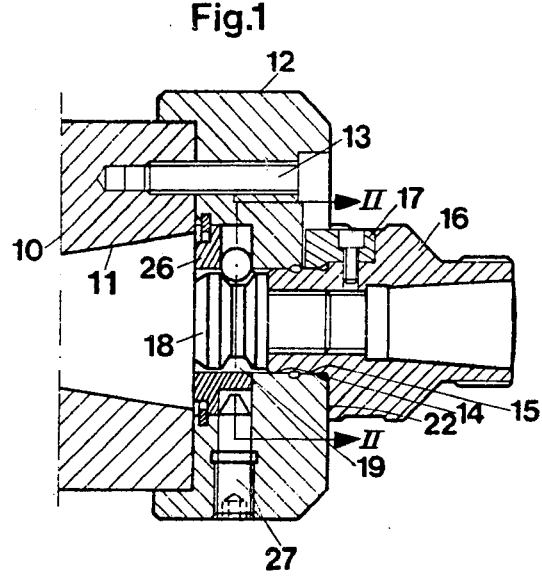

In FIG. 1, the front end of a drive spindle 10 of a machine tool, not shown, is in conventional manner provided with a conical bore 11. The bore 11 is intended to receive a standard base taper, not shown. According to the invention an adapter 12 is fastened with screws 13 to the drive spindle 10. The adapter 12 is provided with a central recess, which has two inner cylindrical guiding surfaces 14, 15, which are intended to slidably engage with a close fit corresponding guiding surfaces on a tool holder 16. The guiding surface 15 has a somewhat larger diameter than the guiding surface 14. A cutting tool, not shown, is attached to the tool holder 16 as illustrated in German PS 1.552.556.

The tool holder 16 is locked against rotation relative to the adapter 12 by means of a guide member 17.

A head bolt 18 is screwed into the rear end of the tool holder 16. The bolt 18 is provided with a groove 19 passing therearound. During clamping of the tool holder 16 a clamping means in the form of a first series of balls 20 is arranged to be moved radially inwards to abutment against an abutting surface 21 in the groove 19, thereby applying a rearwardly directed force on the tool holder 16 so that an annular abutting surface 22 thereon is forced against the adapter 12. The abutting surface 21 extends in the transversal direction of the tool holder 16.

Radially outwardly of the first series of balls 20 there is a second series of balls 23. The balls 23 are guided in radial direction by means of a guiding surface 24 on the adapter 12 and a flange 25 on a lock ring 26. The balls 20, 23 are retained axially between opposed surfaces on the adapter 12 and the lock ring 26.

Figure 2:
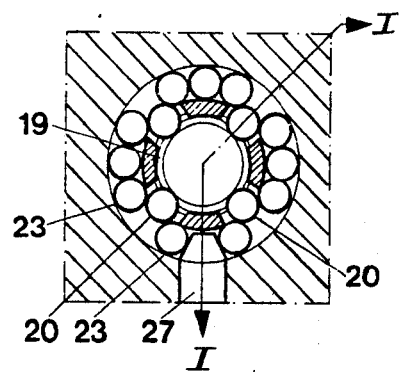
FIG. 2 is a section taken on the line II—II in FIG. 1 showing the tool holder in a clamped position.
Figure 4:
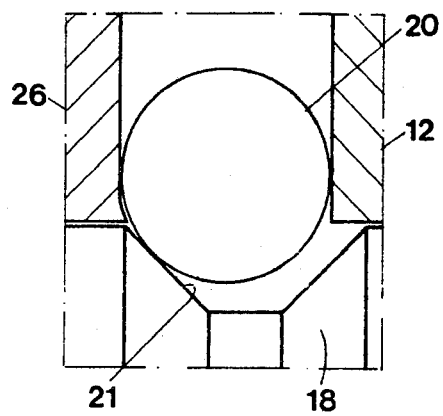
FIG. 4 shows on an enlarged scale a portion of the ball looking system in FIG. 1.
Figure 3:
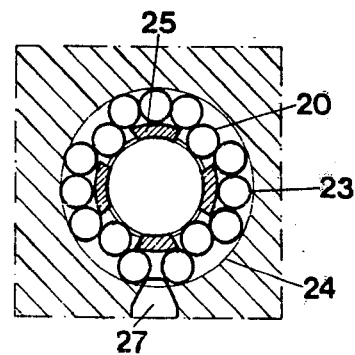
FIG. 3 is a section similar to that in FIG. 2 but showing the tool holder in a loosened position.

A clamping member in form of a screw 27 is radially movable between two consecutive balls 23. Upon a radially inwardly directed movement of the screw 27, i.e. from the position shown in FIG. 3 to the position shown in FIG. 2, the above consecutive balls 23 are wedgingly moved apart, thereby applying forces on two adjacent balls 20 in the first series. Due to the fact that the balls 20 are forcibly guided between two consecutive balls 23 in the second series the balls 20 then are forced radially inwards against the abutting surface 21. The force flow caused by the screw 27, thus, passes alternately via balls in the first and second series.

The balls 20, 23 in the two series are equally spaced along the periphery of the bolt 18. In the preferred embodiment there are four balls 20 in the first series and the balls are diametrically opposed in pairs. Three balls 23 in the second series are positioned between two consecutive balls 20 with the exception that the screw 27 replaces one ball 23.

In the preferred embodiment there is obtained an equally distributed clamping force around the periphery of the tool holder. In order to achieve this force equalization it is not necessary that the bolt 18 is exactly centralized in the tool holder 16, since the balls 20, 23 clamp uniformly in spite of any eccentricity of the bolt 18. Thus, the required centralizing of the tool holder is achieved solely by means of the close-fitting guiding surfaces 14, 15. Consequently, the bolt 18 and the clamping balls 20, 23 do not cause any one-sidedly directed transversal forces.

Figure 5:
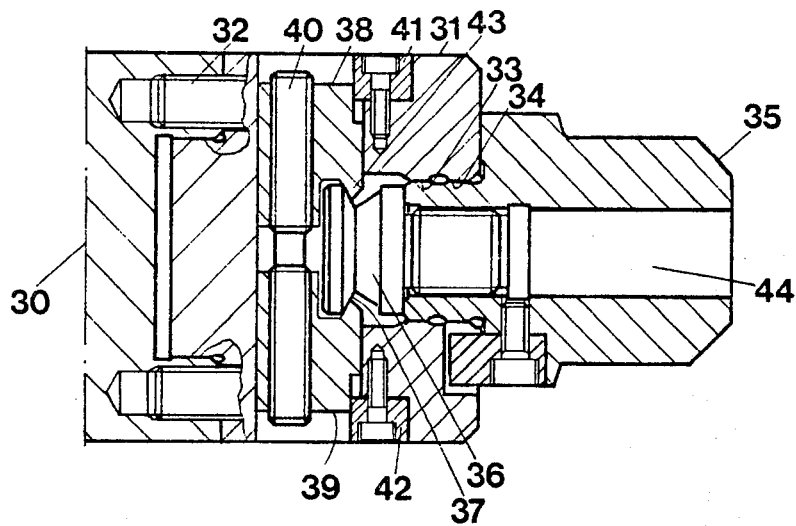
FIGS. 5 and 6 show a longitudinal section through alternative embodiments of a device according to the invention.

In FIG. 5 there is shown a drive spindle 30 which does not have any conical bore but where a tool holder is intended to be fastened with screws. This is as previously mentioned a time consuming operation. According to the invention an adapter 31 is attached to the drive spindle 30 by means of screws 32. A cutting tool is connected to the adapter 31 by inserting a shaft end on the cutting tool into a bore 44 and in conventional manner fixing the shaft end therein. In similarity with the embodiment according to FIG. 1 the adapter 31 is provided with a central recess, which has guiding surfaces 33, 34. A head bolt 36 is screwed into the rear end of a tool holder 35. The bolt 36 is provided with a groove passing therearound, which has an abutting surface 37. Two clamping members 38, 39 are synchronously movable in the adapter 31 in radially opposite directions by means of a double-threaded screw 40. The clamping members 38, 39 are guided by means of guide members 41, 42, which are fastened with screws to the adapter 31. The clamping members 38, 39 are provided with a projecting portion 43, which is intended to cooperate with the abutting surface 37, thereby providing a locking means. In similarity with the embodiment according to FIG. 1 an equally distributed clamping force is obtained since the clamping members 38, 39 will move radially as a unit in case of any eccentricity of the bolt 36.

Figure 6:
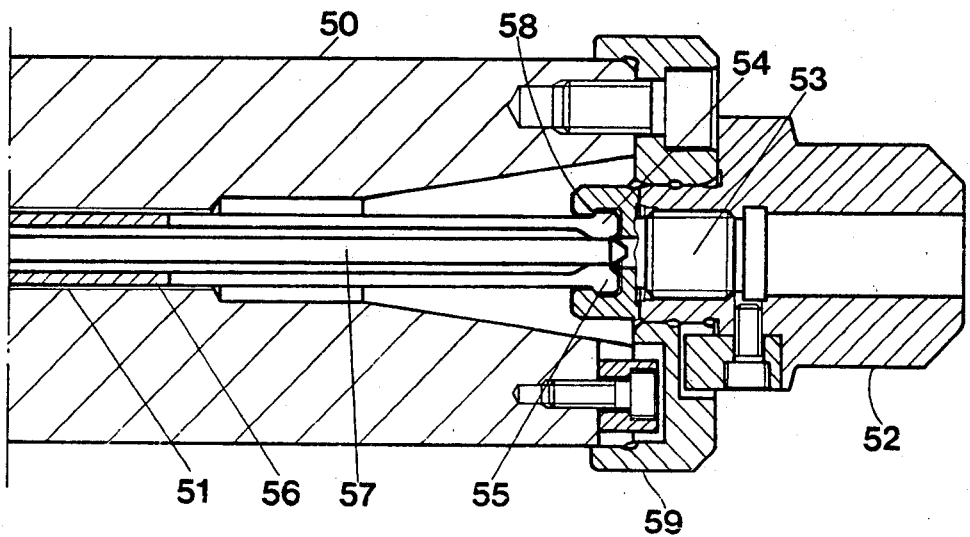

In FIG. 6 an embodiment is shown which certainly requires a drive spindle 50 having a transversing bore 51 but in which a tool holder 52 can be rapidly attached and detached to an adapter 59, while simultaneously requiring a small working space due to the short axial movement of the tool holder during exchange thereof. The tool holder 52 coincides with the tool holder 35 in FIG. 5 with the exception that the bolt 53 is provided with an inner groove 54. During clamping of the tool holder 52 radial projections 55 on tongues of a slitted tubular element 56 are moved into the groove 54 by means of a rod 57, whereupon a rearwardly directed force is applied on an abutting surface 58 formed by the rear wall of the groove 54. The rod 57 and the element 56 are of the same basic design as shown in German OS 2.741.810.

We claim:

1. A mounting device for securing a tool holder to a drive spindle, comprising an adapter which, in use, is attached to the drive spindle and carries the tool holder, the adapter being provided with a central recess having at least one inner guiding surface for guiding a rearwardly projecting portion of the tool holder, said portion projecting rearwardly past said guiding surface, and clamping means arranged to apply a rearwardly directed force on an abutting surface on the tool holder for clamping the latter against the adapter, said clamping means and said tool holder being separate members, said abutting surface extending transversely relative to the longitudinal axis of the tool holder, and being positioned axially behind said guiding surface, said clamping means comprising a plurality of elements engaging said abutting surface at circumferentially spaced locations, said elements being radially movable relative to said adapter while maintaining clamping relationship with said abutting surface to compensate for eccentricity of the latter, wherein said elements comprise a first series of rollers arranged for engagement with the abutting surface, a second series of rollers positioned radially outwardly of the first series, and a clamping member arranged to move apart two consecutive rollers in the second series by a wedge action such that said second series of rollers urge said first series of rollers radially inwardly into engagement with said abutting surface.

2. A mounting device for securing a tool holder to a drive spindle, comprising an adapter which, in use, is attached to the drive spindle and carries the tool holder, the adapter being provided with a central recess having at least one inner guiding surface for guiding a rearwardly projecting portion of the tool holder, said portion projecting rearwardly past said guiding surface, and clamping means arranged to apply a rearwardly directed force on an abutting surface on the tool holder for clamping the latter against the adapter, said clamping means and said tool holder being separate members, said abutting surface extending transversely relative to the longitudinal axis of the tool holder, and being positioned axially behind said guiding surface, the clamping means comprises a first series of balls arranged for cooperation with the abutting surface, a second series of balls which are positioned radially outwardly of the first series, and a clamping member which is arranged to move apart two consecutive balls in the second series by wedge action to move said first series of balls radially inwardly to effect clamping of the tool holder.

* * * * *